United States Patent [19]

Luo

[11] Patent Number: 5,698,181

[45] Date of Patent: Dec. 16, 1997

[54] BREATH-FRESHENING EDIBLE COMPOSITIONS COMPRISING MENTHOL AND AN N-SUBSTITUTED-P-MENTHANE CARBOXAMIDE AND METHODS FOR PREPARING SAME

[75] Inventor: Shiuh J. Luo, Livingston, N.J.

[73] Assignee: Warner-Lambert Company, Morris Plains, N.J.

[21] Appl. No.: 438,824

[22] Filed: May 11, 1995

Related U.S. Application Data

[63] Continuation-in-part of Ser. No. 353,031, Dec. 9, 1994, abandoned.

[51] Int. Cl.$^6$ ............... A61K 7/16; A61K 9/68; C01B 31/32; C01B 31/26
[52] U.S. Cl. ............... 424/49; 424/48; 424/441; 424/444
[58] Field of Search ............... 424/48, 49, 444, 424/441

[56] References Cited

U.S. PATENT DOCUMENTS

| | | | |
|---|---|---|---|
| 2,525,072 | 10/1950 | Kearby | 424/48 |
| 2,922,747 | 1/1960 | Scanlan | 424/440 |
| 4,060,091 | 11/1977 | Watson et al. | 131/276 |
| 4,112,066 | 9/1978 | Hussein | 424/48 |
| 4,136,163 | 1/1979 | Watson et al. | 424/54 |
| 4,150,052 | 4/1979 | Watson et al. | 564/123 |
| 4,178,459 | 12/1979 | Watson et al. | 560/125 |
| 4,190,643 | 2/1980 | Watson et al. | 424/54 |
| 4,193,936 | 3/1980 | Watson et al. | 564/123 |
| 4,226,988 | 10/1980 | Watson et al. | 544/116 |
| 4,724,151 | 2/1988 | Mansukhani et al. | 426/3 |
| 5,009,893 | 4/1991 | Cherukuri et al. | 424/440 |
| 5,244,670 | 9/1993 | Upson et al. | 424/439 |
| 5,372,824 | 12/1994 | Record | 426/3 |

FOREIGN PATENT DOCUMENTS

| | | |
|---|---|---|
| 989738 | 5/1976 | Canada . |
| 1311060 | 3/1973 | United Kingdom . |
| 2233873 | 1/1991 | United Kingdom . |
| 9323005 | 11/1993 | WIPO . |
| 9325177 | 12/1993 | WIPO . |
| 9408550 | 4/1994 | WIPO . |
| 9408551 | 4/1994 | WIPO . |
| 9421135 | 9/1994 | WIPO . |
| 9425003 | 11/1994 | WIPO . |
| 9425009 | 11/1994 | WIPO . |

*Primary Examiner*—Carlos A. Azpuru
*Attorney, Agent, or Firm*—Linda A. Vag

[57] ABSTRACT

The present invention is a directed at chewing gum compositions having long-lasting breath freshening perception without bitterness comprising (a) a gum base; (b) a bulking agent; and (c) a cooling composition; wherein the cooling composition comprises menthol and an N-substituted-p-menthane carboxamide, wherein the carboxamide may be represented by the formula:

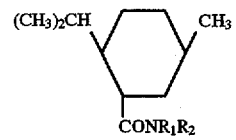

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; and wherein the N-substituted-p-menthane carboxamide is present in the cooling composition in an amount from about 0.001% to about 6%, and menthol is present in the cooling composition in an amount from about 94% to about 99.999%. The present invention is also directed at confectionery compositions containing the novel cooling composition and methods for preparing the novel chewing gum and confectionery compositions.

27 Claims, No Drawings

5,698,181

1

BREATH-FRESHENING EDIBLE COMPOSITIONS COMPRISING MENTHOL AND AN N-SUBSTITUTED-P-MENTHANE CARBOXAMIDE AND METHODS FOR PREPARING SAME

This is a continuation-in-part of application Ser. No. 08/353,031 filed on Dec. 9, 1994 now abandoned.

BACKGROUND OF THE INVENTION

1. Field of the Invention

This invention pertains to edible compositions having long-lasting breath freshening perception without bitterness. The edible compositions contain a cooling composition which comprises menthol and an N-substituted-p-menthane carboxamide. The cooling compositions may be used in a wide variety of edible products such as chewing gum compositions and hard and soft candy confections.

2. Description of the Background

Edible compositions such as chewing gums and candy confectionery products are commonly used to enhance the consumer's breath and provide a clean, cool, flesh feeling in the mouth. Most chewing gums and other confectionery products can provide at least marginal breath freshening for the first few minutes when the flavor is most intense, but lack the ability to maintain the cooling perception for extended periods of time, such as up to 30 minutes.

Chewing gums in particular have not provided a breath freshening perception over a sustained period of time. In some gums, a greater than normal amount of mint flavor may be added to the gum to achieve a breath-freshening effect, but the gums usually have harsh and bitter tones. Such bitter tones are attributed to the presence of menthol. Harsh tones, of course, are unacceptable to the consumer. Larger amounts of flavoring agents are also unacceptable because the flavor oils tend to plasticize the gum base altering the texture and consistency of the chewing gum. For these reasons, the simple addition of higher levels of mint flavoring agent will not provide a satisfactory chewing gum having enhanced breathfreshening.

Many edible compositions employ a combination of flavor oils and flavor powders to increase flavor impact and extend taste over a prolonged period of time. Techniques such as flavoring agent or sweetening agent encapsulation are also used to provide a timed release of active agents to achieve prolonged and sequential delivery of the flavoring agent or sweetening agent.

Edible compositions designed to provide breathfreshening often incorporate a deodorizing additive. For example, U.S. Pat. No. 2,525,072 discloses chewing gums containing inorganic silicone and magnesium powder which serve as odor absorbents. U.S. Pat. No. 2,922,747 discloses the use of chlorophyll, vegetable oils (lipids), and lecithin as deodorants in tablets and chewing gum compositions.

Canadian patent no. 989,738 discloses a wafer containing cetylidimethylbenzylammonium chloride and peppermint oil to provide residual breath-sweetening in the mouth. U.S. Pat. No. 4,112,066 discloses breath-freshening compositions containing calcium and magnesium carbonate in combination with copper gluconate in a mint flavored tablet. French Demande 2,127,005 discloses edible compositions containing 10–2000 ppm α-ionone, α-methylionone, citral, or geranyl formate to mask odors.

U.S. Pat. No. 4,724,151 dislcoses a mint flavored chewing gum composition having improved breath-freshening perception comprising 1) a liquid flavor oil selected from the group consisting of spearmint oil and peppermint oil wherein the flavor oil has a menthol content of about 27% to about 36%; 2) a spray-dried flavor oil selected from the group consisting of peppermint oil and spearmint oil; and 3) spray-dried menthol present in amounts from about 0.2% to about 0.75%, by weight. The chewing gums employ the cooling sensation of mint flavor oils combined with menthol to produce a fresh impact and sustained cooling sensation.

U.S. Pat. Nos. 4,060,091, 4,136,163, 4,150,052, 4,178,459, 4,190,643, 4,193,936, and 4,226,988 disclose N-substituted-p-menthane carboxamides which stimulate the cold receptors of the nervous system to produce cold sensations.

U.S. Pat. No. 5,009,893 (Cherukuri et al.) discloses confectionery compositions containing a cooling composition comprising menthol and an N-substituted-p-menthane carboxamide. Cherukuri et al. teach that it is critical that the amount of the N-substituted-p-menthane carboxamide in the cooling composition be above 30% because lower amounts of the carboxamide form bitter products. Cherukuri et al. teach only the use of low levels of menthol (about 0.77% maximum, by weight of the total composition, adjusted to include menthol present in peppermint oil) in an edible composition.

U.S. Pat. No. 5,244,670 discloses pharmaceutical compositions comprising 3-1-menthoxy propane 1,2-diol and an agent for relieving upper gastrointestinal tract distress.

WO 93/23005 discloses a cooling composition comprising a first cooling component which is a ketal $R_2R_3C(O_2)R_1$ and a second cooling component which may be an N-substituted-p-menthane carboxamide. WO 93/25177 discloses a cooling composition comprising a first cooling component which is an acyclic carboxamide and a second cooling component which is an N-substituted-p-menthane carboxamide.

SUMMARY OF THE INVENTION

The present invention is a directed at edible compositions having long-lasting breath freshening perception without bitterness.

The present invention is directed at confectionery compositions having long-lasting breath freshening perception without bitterness comprising:

(a) a confectionery bulking agent; and (b) a cooling composition;

wherein the cooling composition comprises menthol and an N-substituted-p-menthane carboxamide, wherein the carboxamide may be represented by the formula:

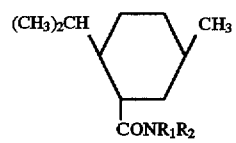

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; wherein the N-substituted-p-menthane carboxamide is present in the cooling composition in an amount from about 0.001% to about 6%, menthol is present in the cooling composition in an amount from about 94% to about 99.999%.

In particular, the invention is a directed at chewing gum compositions comprising:

(a) a gum base;
(b) a bulking agent; and
(c) a cooling composition;

wherein the cooling composition comprises menthol and an N-substituted-p-menthane carboxamide, wherein the carboxamide may be represented by the formula:

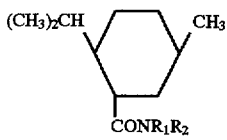

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; wherein the N-substituted-p-menthane carboxamide is present in the cooling composition in an amount from about 0.001% to about 6%, menthol is present in the cooling composition in an amount from about 94% to about 99.999%.

The cooling compositions may be used in a wide variety of edible products. The present invention also pertains to methods for preparing and using the cooling compositions and the edible products in which they may be used.

DETAILED DESCRIPTION OF THE INVENTION

Applicants have discovered that the combination of a N-substituted-p-menthane carboxamide and menthol results in a cooling composition which may be employed in an edible composition to provide a high initial cooling perception as well as long-lasting, breath-freshing for an extended period of time. The combination of a N-substituted-p-menthane carboxamide and menthol may be used in both sugared and sugarless products to achieve this heightened cooling perception. While the precise reason why these cooling components give an enhanced breath-freshening effect is not entirely understood, each component is known to play a vital role. The presence of only one of these cooling components will not provide the desired results. Menthol, when used alone, has an initial high flavor impact, but the flavor impact drops sharply within a few minutes after use and menthol tends to distort flavor notes and render the product bitter. N-substituted-p-menthane carboxamides do not provide any initial cooling perception. The combination of N-substituted-p-menthane carboxamide and menthol in specific amounts overcomes the deficiency of each cooling component. Moreover, the synergy between menthol and an N-substituted-p-menthane carboxamide is quite different when menthol is present in an edible composition at a high level, for example, in an amount greater than about 0.7% by weight. For chewing gum compositions it is preferred to use menthol in higher amounts. In the present invention it is preferred to use menthol in an amount from about 0.7% to about 2% by weight of the chewing gum base.

The amount of N-substituted-p-menthane carboxamide necessary to deliver the long breath freshening and the highest over-all preference is from about 0.001% to about 6%, by weight of the cooling composition. When the amount of N-substituted-p-menthane carboxamide cooling compound exceeds this level, the compositions become very undesirable in over-all preference.

It has further been found that sugar alcohols enhance the cooling effect of a menthol and N-substituted-p-menthane carboxamide cooling compound mixture.

The term "edible", as used herein, refers to all materials and compositions which are used by or which perform a function in the body and which may also be referred to as ingestible. These materials and compositions include those which are adsorbed and those which are not absorbed as well as those which are digestible and non-digestible.

In accord with the present invention, the cooling compositions comprise menthol and an N-substituted-p-menthane carboxamide.

Menthol ($1\alpha,2\beta,5\alpha$)-5-methyl-2-(1-methylethyl)-cyclohexanol; 3-p-menthanol; l-menthol; peppermint camphor) may be represented by formula:

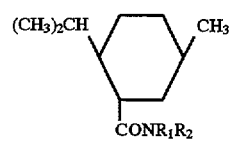

L-Menthol has a molecular weight of 156.26, a melting point of 41°–43° C., exists as white crystals with a peppermint, cooling odor and taste, and is slightly soluble in water. L-Menthol is used in liqueurs, confectionery, perfumery, cigarettes, cough drops, and nasal inhalers.

The total amount of l-menthol used in the cooling compositions of the present invention is an effective amount to provide long-lasting breath freshening perception without bitterness. The exact amount of the l-menthol employed in the cooling compositions is a matter of preference subject to such factors as the degree of vapor action desired. Thus, the amount of l-menthol may be varied in order to obtain the result desired in the final product and such variations are within the capabilities of those skilled in the an without the need for undue experimentation. In general, the total amount of l-menthol normally present in a cooling composition will be from about 94% to about 99.999%, more preferably from about 94% to about 99.99%, and most preferably from about 96% to about 99%, by weight. The total amount of menthol is the amount of free menthol present in the edible composition plus the amount of menthol present in any flavor oils.

The cooling compositions further comprise an N-substituted-p-menthane carboxamide which may be represented by formula (1):

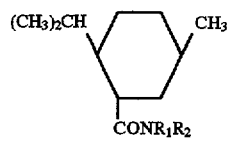

In formula (1), $R_1$ and $R_2$ may be independently selected from the group consisting of hydrogen and an alkyl group containing from 1 to 25 carbon atoms. When $R_1$ is hydrogen, $R_2$ may be an aryl group containing from 6 to 10 carbon atoms. The aryl groups may be selected from the group consisting of substituted phenyl, phenylalkyl, naphthyl, substituted naphthyl, and pyridyl. $R_1$ and $R_2$, when taken together, may also be a cyclic or heterocyclic group containing up to 25 carbon atoms. N-Substituted-p-menthane carboxamide of the type which may be employed in the present invention are more fully described in U.S. Pat. No. 4,136,163, which disclosure is incorporated herein by reference. In a preferred embodiment, the N-substituted-p- menthane carboxamide is N-ethyl-p-menthane 3-carboxamide.

The amount of the N-substituted-p-menthane carboxamide used in the cooling compositions of the present invention is an effective mount to provide long-lasting breath freshening perception without bitterness. The exact amount of the N-substituted-p-menthane carboxamide employed in the cooling compositions is a matter of preference subject to such factors as the degree of vapor action desired. Thus, the amount of N-substituted-p-menthane carboxamide may be varied in order to obtain the result desired in the final product and such variations are within the capabilities of those skilled in the art without the need for undue experimentation. In general, the amount of N-substituted-p-menthane carboxamide normally present in a cooling composition will be from about 0.001% to about 6%, more preferably from about 0.01% to about 6%, and most preferably from about 1% to about 4%, by weight.

Although the N-substituted-p-menthane carboxamide compounds of the present invention are generally insoluble in water, the carboxamides may be employed in the edible formulations as particulate solids and added directly to the formulations or blended with other solid ingredients used to make the compositions. The N-substituted-p-menthane carboxamide compounds may be added in several forms, such as in the form of an encapsulate, or a premix with a flavor oil (dissolved in a polar solvent and then used in the inventive formulation. Encapsulation may be employed when a delay in cooling perception is desired and may be performed using water-insolubles well as water-soluble agents. Encapsulation may be achieved using conventional procedures which do not constitute a part of this invention. When the N-substituted-p-menthane carboxamide compounds are premixed in a polar solvent, the solvents may be selected from a wide variety of materials such as those solvents selected from the group consisting of ethyl alcohol, ethyl acetate, diethyl ether, isopropyl alcohol, and glycerin. The use of a premix is particularly preferred when preparing confectionery products in order to obtain a uniform mixture of compounds into the confectionery matrix. In chewing gums which employ glycerin, the N-substituted-p-menthane carboxamide may be simply preblended into the glycerin and then added to the product. The same premix procedure may be employed when using a flavor oil. Such premixtures aid in enhancing uniform distribution in the product and efficient release during use.

As set out above, menthol is present in the edible compositions of the present invention at high levels where those edible compositions are chewing gums, or any edible composition wherein a high level of menthol is desirable. For example, L-menthol is preferably present in such edible compositions in an amount from about 0.7% to about 2%, more preferably from about 1% to about 2%, and most preferably from about 1.25% to about 2%, by weight.

In a preferred embodiment, the cooling compositions further comprise a sugar alcohol. Sugar alcohols further enhance the cooling effect of the menthol and an N-substituted-p-menthane carboxamide mixture. Suitable sugar alcohols include sorbitol, xylitol, mannitol, galactitol, maltitol, PALATINIT® (isomalt, Suddeutsch Zucker-Aktiengesellschaft) and mixtures thereof. Preferred sugar alcohols are xylitol, mannitol, and sorbitol.

The amount of the sugar alcohol used in the chewing gum compositions of the present invention is an effective amount to provide long-lasting breath freshening perception without bitterness. The exact amount of the sugar alcohol employed in the chewing gum compositions is a matter of preference subject to such factors as the degree of cooling desired. Thus, the amount of sugar alcohol may be varied in order to obtain the result desired in the final product and such variations are within the capabilities of those skilled in the an without the need for undue experimentation. In general, the amount of sugar alcohol normally present in a chewing gum composition will be from about 1% to about 80%, more preferably from about 20% to about 70%, and most preferably from about 40% to about 60%, by weight.

The combination of menthol and an N-substituted-p-menthane carboxamide in the present invention provides a cooling composition having long-lasting breath freshening perception without bitterness. The cooling composition may be used in a wide variety of edible products such as chewing gum compositions, and hard and soft candy confections.

The present invention extends to methods for preparing the cooling compositions. In such a method, the cooling composition is prepared by admixing menthol and an N-substituted-p-menthane carboxamide to form a uniform mixture. The final compositions are readily prepared using standard methods and apparatus generally known by those skilled in the confectionery arts. The apparatus useful in accordance with the present invention comprises mixing apparatus well known in the confectionery arts, and therefore the selection of the specific apparatus will be apparent to the artisan.

In a preferred embodiment, the present invention is directed at a method for preparing a cooling composition having long-lasting breath freshening perception without bitterness which comprises admixing menthol and an N-substituted-p-menthane carboxamide, wherein the carboxamide may be represented by the formula:

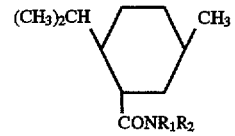

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; and wherein the N-substituted-p-menthane carboxamide is present in the cooling composition in an amount from about 0.001% to about 6%, menthol is present in the cooling composition in an amount from about 94% to about 99.999%.

Once prepared, the inventive cooling composition may be stored for future use or may be formulated in effective amounts with conventional additives, such as pharmaceutically acceptable carriers or confectionery ingredients to prepare a wide variety of edible compositions, such as foodstuffs, beverages, hard and soft candy confection products, orally administered pharmaceutical compositions, and hygienic products such as toothpastes, dental lotions, mouth washes, and chewing gums.

The amount of the inventive cooling composition employed in an edible composition is an effective amount to provide long-lasting breath freshening perception without bitterness. The exact amount of the cooling composition employed is a matter of preference, subject to such factors as the type of pharmaceutically acceptable carrier employed in the composition and the strength of long-lasting breath freshening perception desired. Thus, the amount of cooling composition may be varied in order to obtain the result desired in the final product and such variations are within the capabilities of those skilled in the art without the need for undue experimentation. In general, the amount of cooling composition present in an edible composition will be from about 0.01% to about 2% by weight of the edible composition.

The present invention extends to methods for making the edible compositions. In such a method, a composition is made by admixing an effective amount of the cooling composition of the present invention with a pharmaceutically acceptable carrier or confectionery material and the other ingredients of the final desired edible composition. Other ingredients will usually be incorporated into the composition as dictated by the nature of the desired composition as well known by those having ordinary skill in the art. The ultimate edible compositions are readily prepared using methods generally known in the food technology and pharmaceutical arts.

In another embodiment, the present invention is directed at a method for providing long-lasting breath freshening perception without bitterness in an edible composition which comprises admixing an effective amount of the cooling composition with the edible composition.

An important aspect of the present invention includes an improved chewing gum composition incorporating the inventive cooling composition and a method for preparing the chewing gum composition, including both chewing gum and bubble gum formulations. In general, the improved chewing gum compositions will contain a gum base, a bulking agent, an effective amount of the inventive cooling composition, and various additives such as a flavoring agent.

The chewing gum compositions may be reduced-calorie chewing gums employing high levels of a chewing gum base having an enhanced hydrophilic character. These reduced-calorie chewing gums will comprise a gum base present in an amount from about 50% to about 85%, preferably from about 50% to about 75%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing bum compositions in place of a bulking and/or a bulk sweetening agent to prepare high base-low bulking agent reduced-calorie gums which do not have robbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 15%, and preferably in amounts from about 2% to about 12%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components am admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the invention pertains to a reduced-calorie chewing gum composition which comprises a gum base present in an amount from about 40% to about 75%, by weight of the chewing gum composition, which comprises (a) an elastomer present in an mount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive cooling composition and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an mount from about 50% to about 85%, preferably from about 50% to about 75%, and more preferably from about 60% to about 70%, by weight of the chewing gum composition.

In another embodiment, the invention pertains to a chewing gum composition which contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the cooling composition of the present invention and conventional additives to prepare a wide variety of chewing gum compositions.

The chewing gum compositions generally include bulking agents. These bulking agents (carders, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in mounts up to about 60%, and preferably in mounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. When the chewing gum composition is a sugar gum, mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The chewing gum compositions may also include a high intensity sweetening agent (sweeteners). High intensity sweetening agents have a sweetness intensity substantially greater than that of sucrose. Suitable high intensity sweetening agents include water-soluble natural sweetening agents such as dihydrochalcones, monellin, *Stevia Rebaudiana* (steviosides), glycyrrhizin, and mixtures thereof. Suitable water-soluble artificial sweetening agents include saccharin and its soluble salts, i.e., sodium and calcium saccharin salts, cyclamate and its salts, 3,4-dihydro-6-methyl-1,2,3-oxathiazine-4-one-2,2-dioxide (Acesulfame) and the sodium, ammonium, and calcium salts thereof, and especially the potassium salt of 3,4-dihydro-6-methyl-1,2,3-oxathiazine-4-one-2,2-dioxide (Acesulfame-K).

Suitable dipeptide based sweetening agents include L-aspartic acid derived sweetening agents such as L-aspartyl-L-phenylalanine methyl ester (Aspartame), compounds described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine, and L-aspartyl-L-(1-cyclohexen)alanine.

Other suitable water-soluble sweetening agents include those derived from naturally occurring water-soluble sweetening agents such as chlorinated derivatives of sucrose, e.g., chlorodeoxysugar derivatives such as derivatives of chlorodeoxysucrose and chlorodeoxy-galactosucrose. Examples of chlorodeoxysucrose and chlorodeoxygalactosucrose derivatives include but are not limited to 1-chloro-1'-deoxysucrose; 4-chloro-4-deoxy-alpha-D-galactopyranosyl-alpha-D-fructofuranoside, or 4-chloro-4- deoxygalactosucrose; 4-chloro-4-deoxy-alpha-D-galacto-pyranosyl-1-chloro- 1-deoxy-beta-D-fructo-furanoside, or 4,1'-dichloro-4,1'-dideoxygalactosucrose; 1',6'-dichloro-1',6'-dideoxysucrose; 4-chloro-4-deoxy-alpha-D-galacto-pyranosyl-1,6-dichloro-1,6-dideoxy-beta-D-fructo-furanoside, or 4,1',6'-trichloro-4,1',6'-trideoxygalacto-sucrose; 4,6-dichloro-4,6-dideoxy-alpha-D-galacto-pyranosyl-6-chloro-6-deoxy-beta-D-fructo-furanoside, or 4,6,6'-trichloro-4,6,6'-trideoxygalacto-sucrose; 6,1,6'-trichloro-6,1,6'-trideoxysucrose; 4,6-dichloro-4,6-dideoxy-alpha-D-galacto-pyranosyl-1,6-dichloro-1,6-di-deoxy-beta-D-fructofuranoside, or 4,6,1,6'-tetrachloro-4,6,1,6'-tetradeoxygalacto-sucrose; and 4,6,1,6'-tetrachloro-4,6,1,6'-tetradeoxy-sucrose. In a preferred embodiment, the chlorodeoxysugar derivative is 4,1',6'-trichloro-4,1',6'-trideoxygalacto-sucrose, or 4-chloro-4-deoxy-alpha-D-galactopyranosyl-1,6-dichloro-1,6-dideoxy-beta-D-fructofuranoside, which is commercially available under the tradename Sucralose from McNeil Specialty Products Company, Skillman, N.J.

Other suitable high intensity sweetening agents include protein based sweetening agents such as talin (*thaumaoccous danielli*, Thaumatin I and II).

The amount of the high intensity sweetening agent employed in the chewing gum composition is an effective amount to sweeten the chewing gum. In general, the amount of high intensity sweetening agent normally present in a chewing gum composition will be from about 0.001% to about 1%, preferably from about 0.01% to about 1%, and more preferably from about 0.05% to about 0.5%, by weight of the chewing gum composition.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetening agent, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Nonlimiting examples include paraffin wax, petrolatum, carbowax, microcrystalline wax, beeswax, carnauba wax, candelilla wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the cooling composition of the present invention may be admixed into the chewing gum composition. As set out above, the cooling compositions of the present invention comprise menthol and an N-substituted-p-menthane carboxamide. The exact amount of cooling composition employed is normally a matter of preference subject to such factors as the particular type of gum composition being prepared, the type of bulking agent employed, the type of flavor employed, and the intensity of breath freshening perception desired. Thus, the amount of cooling composition may be varied in order to obtain the result desired in the final product and such variations are within the capabilities of those skilled in the art without the need for undue experimentation. In general, the amount of cooling composition normally present in a chewing gum composition will be from about 0.07% to about 2%, preferably from about 1% to about 2%, and more preferably from about 1.25% to about 2%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the cooling composition and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive cooling composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

In a preferred embodiment, the invention is directed at a method for preparing a chewing gum composition having long-lasting breath freshening perception without bitterness which comprises the steps of:

(1) providing the following ingredients:

(a) a gum base;

(b) a bulking agent; and (c) a cooling composition;

wherein the cooling composition comprises menthol and an N-substituted-p-menthane carboxamide, wherein the carboxamide may be represented by the formula:

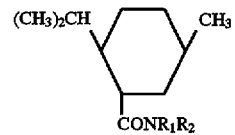

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; and wherein the N-substituted-p-menthane carboxamide is present in the cooling composition in an amount from about 0.001% to about 6%, menthol is present in the cooling composition in an amount from about 94% to about 99.999%;

(2) melting the gum base;

(3) admixing the bulking agent and the cooling composition with the melted gum base; and (4) forming the mixture from step (C) into suitable shapes.

The cooling composition is prepared according to the method of the present invention.

Another important aspect of the present invention includes a candy confection composition incorporating the inventive cooling composition and a method for preparing the confectionery compositions. The preparation of confection formulations is historically well known and has changed little through the years. Candy confection items have been classified as either "hard" confectionery or "soft" confectionery. The cooling compositions of the present invention can be incorporated into the confections by admixing the inventive composition into the conventional hard and soft confections.

Hard candy confection may be processed and formulated by conventional means. In general, a hard confection has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% sugar, up to about 55% corn syrup and from about 0.1% to about 5% water, by weight of the final composition. The syrup component is generally prepared from sucrose and corn syrups, but may include other materials. Further ingredients such as flavorings, sweetening agents, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavoring agent, colorants and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavoring agent, colorants and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavoring agent, colorants, and other additives are admixed in the mass by routine mechanical mixing operations.

The optimum mixing required to uniformly mix the flavoring agent, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, Pharmaceutical Dosage Forms: Tablets, Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavoring agent, colorants and so forth.

Similar to hard candy confection, soft candy confection may be utilized in this invention. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B.W. Minifie, Chocolate, Cocoa and Confectionery: Science and Technology, 2nd edition, AVI Publishing Co., Inc., Westport, Conn. (1980), at pages 424–425, which disclosure is incorporated herein by reference.

The procedure for preparing the soft confection involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the cooling compositions of the present invention may be admixed into the hard and soft confections. As set out above, the cooling compositions of the present invention comprise menthol and an N-substituted-p-menthane carboxamide. The exact mount of cooling composition employed is normally a matter of preference subject to such factors as the particular type of confection being prepared, the type of bulking agent or carrier employed, the type of flavor employed and the intensity of breath freshening perception desired. Thus, the amount of cooling composition may be varied in order to obtain the result desired in the final product and such variations are within the capabilities of those skilled in the art without the need for undue experimentation. In general, the amount of cooling composition normally present in a hard or soft candy confection will be from about 0.01% to about 2%, preferably from about 0.1% to about 2%, and more preferably from about 0.25% to about 2%, by weight of the confection.

The present invention extends to methods for making the improved candy confections. The cooling compositions may be incorporated into an otherwise conventional hard or soft confection composition using standard techniques and equipment known to those skilled in the art. The apparatus useful in accordance with the present invention comprises mixing and heating apparatus well known in the confectionery manufacturing arts, and therefore the selection of the specific apparatus will be apparent to the artisan.

In such a method, a composition is made by admixing the inventive cooling composition into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture may be formed into desirable confectionery shapes.

The cooling compositions may be formulated with conventional ingredients which offer a variety of textures to suit particular applications. Such ingredients may be in the form of hard and soft candy confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such candy confections and chewing gum products is well known.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES 1–19

These examples demonstrate a comparison of cooling compositions prepared according to the present invention versus conventional cooling compositions.

The cooling compositions of examples 1–8 had the formulas set out in Table 1 below. The formulas were calculated to include the 50% menthol contribution from peppermint oil.

TABLE 1

COOLING COMPOSITIONS

| Example | Ratio* | 1 minute Cooling | 5 minute Cooling | Bitterness | Over-all Preference |
|---|---|---|---|---|---|
| 1 | 100:0 | 50 | 20 | 10 | 60 |
| 2 | 98.9:1.1 | 90 | 40 | 40 | 60 |
| 3 | 97.8:2.2 | 90 | 40 | 60 | 70 |
| 4 | 97.0:3.0 | 80 | 50 | 50 | 75 |
| 5 | 96.6:3.4 | 60 | 60 | 20 | 70 |
| 6 | 95.8:4.2 | 70 | 60 | 20 | 70 |
| 7 | 95.2:4.8 | 60 | 60 | 30 | 50 |
| 8 | 94.5:5.5 | 65 | 80 | 40 | 25 |

Ratio* = Menthol:N-ethyl-p-menthane 3-carboxamide

The cooling compositions of examples 1–8 were incorporated into a confection bulking agent to form compositions according to conventional manufacturing techniques. Specifically, the cooling compositions were incorporated into a conventional corn syrup/sugar mixture which was then added to a conventional non-SBR chewing gum base. An expert taste panel evaluated the relative breath freshening perception (cooling) of the gum compositions at 1 and 5 minutes, the bitterness, and the overall preference in random order and the findings were pooled and averaged (on a scale of 0–100; 0 being not breath freshening; and 100 being very breath freshening). The results from the taste panel are set out in Table 1.

In example 1 (control), menthol was present in the composition at a total level of 1.3%, by weight. In the remaining examples, menthol was present in proportional amounts in accord with the ratios set out in Table 1. Table 1 shows that the cooling compositions of examples 3–6 possessed improved breath freshening perception. When menthol is present in the composition at a high level, such as 1.3%, by weight, the synergy effect of menthol and N-ethyl-p-menthane 3-carboxamide is quite different from when menthol is present at lower levels. When menthol is present in the composition at a level of 1.3%, the longest breath freshening and the highest over-all preference was found to occur when N-ethyl-p-menthane 3-carboxamide is present in the cooling composition in an amount from about 0.001% to about 6%, more preferably from about 0.01% to about 6%, and most preferably from about 1% to about 4%. When the amount of N-ethyl-p-menthane 3-carboxamide exceeds 6%, the confection products become very undesirable in over-all preference.

The cooling compositions disclosed in Tables 1 and 2 of U.S. Pat. No. 5,009,893 (Cherukuri et al.) have the formulas set out as Examples 9–19 in Table 2 below. These formulas are revised to include the 50% menthol contribution from peppermint oil. These cooling compositions were also incorporated by Cherukuri et al. into chewing gum formulations.

TABLE 2

COOLING COMPOSITIONS

| Example | Ratio* | Total Menthol | Initial Cooling | Long Lasting Cooling | Bitterness |
|---|---|---|---|---|---|
| 9 | 100:0 | 0.6718% | High | Dropped after 2 min | Yes |
| 10 | 96:4 | 0.6515% | High | Dropped after 2 min | Yes |
| 11 | 92:8 | 0.625% | High | Lasted 15–30 min | No |
| 12 | 88:12 | 0.5984% | High | Lasted 15–30 min | No |
| 13 | 84:16 | 0.5719% | No | Developed after 6 min | |
| 14 | 100:0 | 0.571% | No | | |

TABLE 2-continued

COOLING COMPOSITIONS

| Example | Total Ratio* | Initial Menthol | Long Lasting Cooling | Bitterness |
|---|---|---|---|---|
| 15 | 100:0 | 0.6719% | Some | After 2 min |
| 16 | 100:0 | 0.7719% | Some | After 2 min |
| 17 | 85:15 | 0.5719% | No | Little after 6 min | No |
| 18 | 73:26 | 0.5719% | No | Little after 6 min | No |
| 19 | 53:47 | 0.5719% | No | Little after 6 min | No |

Ratio* = Menthol:N-ethyl-p-menthane 3-carboxamide.

The recalculation shows that the range set out in U.S. Pat. No. 5,009,893 (Cherukuri et al.), where the optimum level for N-ethyl-p-menthane 3-carboxamide cooling compound is 8% to 12% (see Examples 11 and 12) is outside the optimum range for N-ethyl-p-menthane 3-carboxamide cooling compound of the present invention which ranges from 0.001 to 6%.

EXAMPLES 20–35

These examples demonstrate a comparison of cooling compositions containing a sugar alcohol prepared according to the present invention in confectionery compositions versus conventional cooling compositions.

The cooling compositions of examples 20–35 were incorporated into a confection bulking agent to form compositions according to conventional confection manufacturing techniques prepared as in Examples 1–8 of Table 1 and having the formulas set out in Table 3.

TABLE 3

COOLING COMPOSITIONS

| Example | Ratio* | 1 minute Cooling | 5 minute Cooling | Bitterness | Over-all Preference |
|---|---|---|---|---|---|
| 20 | 0.8:16:0.096 | 50 | 90 | 25 | 75 |
| 21 | 0.8:4:0.096 | 40 | 75 | 40 | 65 |
| 22 | 0.8:16:0.024 | 40 | 70 | 15 | 70 |
| 23 | 0.8:4:0.024 | 45 | 70 | 15 | 65 |
| 24 | 0.2:16:0.096 | 35 | 70 | 10 | 65 |
| 25 | 0.2:4:0.096 | 30 | 50 | 10 | 50 |
| 26 | 0.2:16:0.024 | 35 | 45 | 10 | 55 |
| 27 | 0.2:4:0.024 | 35 | 40 | 10 | 55 |
| 28 | 0.5:10:0.06 | 40 | 70 | 10 | 65 |
| 29 | 1.0:10:0.06 | 40 | 80 | 30 | 70 |
| 30 | 0.0:10:0.12 | 20 | 60 | 10 | 60 |
| 31 | 0.5:10:0.12 | 45 | 80 | 30 | 70 |
| 32 | 0.5:10:0.00 | 20 | 40 | 5 | 40 |
| 33 | 0.5:20:0.06 | 40 | 75 | 10 | 65 |
| 34 | 0.5:0:0.06 | 40 | 70 | 35 | 55 |
| 35 | 1.0:0:0.00 | 30 | 30 | 10 | 50 |

Ratio* = Menthol:Xylitol:N-ethyl-p-menthane 3-carboxamide

An expert taste panel evaluated the relative breath freshening perception (cooling) of the compositions at 1 and 5 minutes, the bitterness, and the overall preference in random order and the findings were pooled and averaged (on a scale of 0–100; 0 being not breath freshening; and 100 being very breath freshening). The results from the taste panel are set out in Table 3.

Example 35 (control) contained only menthol present in the composition at a level of 1.0%, by weight. Example 34 (control) contained no xylitol, example 32 (control) contained no N-ethyl-p-menthane 3-carboxamide, and example 30 (control) contained no menthol. In the remaining examples, menthol and N-ethyl-p-menthane 3-carboxamide were present in the composition in proportional amounts in accord with the ratios set out in Table 3. Comparative examples 20 and 21, 22 and 23, 24 and 25 show that when the amount of xylitol in the cooling composition is increased from 4% to 16%, the over all preference for the breath freshening composition increases. Examples 33 and 34 show that when the amount of xylitol in the cooling composition is increased from 0% to 20%, the over all preference for the breath freshening composition increases.

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition having long-lasting breath freshening perception without bitterness comprising:
   (a) a gum base;
   (b) a bulking agent; and
   (c) a cooling composition;
   wherein the cooling composition consists essentially of menthol and an N-substituted-p-menthane carboxamide, wherein the carboxamide may be represented by the formula:

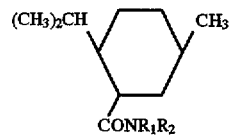

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms;
wherein the N-substituted-p-menthane carboxamide is present in the cooling composition in an amount from about 0.001% to about 6%, and menthol is present in the cooling composition in an amount from about 94% to about 99.999%.

2. The chewing gum composition according to claim 1, wherein the N-substituted-p-menthane carboxamide is N-ethyl-p-menthane 3-carboxamide.

3. The chewing gum composition according to claim 1, wherein the cooling composition is present in the chewing gum composition in the amount from about 0.7% to about 2%, by weight of the chewing gum composition.

4. The chewing gum composition according to claim 1, wherein the N-substituted-p-menthane carboxamide is present in an amount from about 0.01% to about 6%, by weight of the cooling composition.

5. The chewing gum composition according to claim 4, wherein the N-substituted-p-menthane carboxamide is present in an amount from about 1% to about 4%, by weight of the cooling composition.

6. The chewing gum composition according to claim 1 wherein the menthol is present in an amount of from 94 to 99.99% by weight of the cooling composition.

7. The chewing gum according to claim 6 wherein the menthol is present in an amount from 96 to 99% by weight of the cooling composition.

8. The chewing gum composition according to claim 1 wherein the menthol is present in an amount from about 0.7% to about 2% by weight of the chewing gum composition.

9. The chewing gum composition according to claim 8, wherein menthol is present in an amount from about 1% to about 2%, by weight of the chewing gum composition.

10. The chewing gum composition according to claim 9, wherein menthol is present in an amount from about 1.25% to about 2%, by weight of the chewing gum composition.

11. The chewing gum composition according to claim 3 wherein the cooling composition is present in an amount from about 1% to about 2% by weight of the chewing gum composition.

12. The chewing gum composition according to claim 11 wherein the cooling composition is present in an amount from about 1.25% to about 2% by weight of the chewing gum composition.

13. The chewing gum composition according to claim 1, further comprising a sweetening agent.

14. The chewing gum composition according to claim 13, further comprising a sugar alcohol.

15. A confectionery composition having long-lasting breath freshening perception without bitterness comprising:
    (a) a confectionery bulking agent; and
    (b) a cooling composition;
wherein the cooling composition consists essentially of menthol and an N-substituted-p-menthane carboxamide, wherein the carboxamide may be represented by the formula:

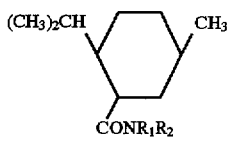

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; wherein the N-substituted-p-menthane carboxamide is present in the cooling composition in an amount from about 0.001% to about 6%, and menthol is present in the cooling composition in an amount from about 94% to about 99.999%.

16. The confectionery composition according to claim 15, wherein the N-substituted-p-menthane carboxamide is N-ethyl-p-menthane 3-carboxamide.

17. The confectionery composition according to claim 15, wherein the cooling composition is present in the confectionery composition in an amount from about 0.01% to about 2%, by weight of the confectionery composition.

18. The confectionery composition according to claim 15 wherein the cooling composition is present in the confectionery composition in an amount from about 0.1% to about 2% by weight of the confectionery composition.

19. The confectionery composition according to claim 18 wherein the cooling composition is present in the confectionery composition in an amount from about 0.25% to about 2% by weight of the chewing gum composition.

20. The confectionery composition according to claim 16, wherein menthol is present in an amount from about 94% to about 99.99%, by weight of the cooling composition.

21. The confectionery composition according to claim 20, wherein menthol is present in an amount from about 96% to about 99%, by weight of the cooling composition.

22. The confectionery composition according to claim 15, wherein the N-substituted-p-menthane carboxamide is present in an amount from about 0.01% to about 6%, by weight of the cooling composition.

23. The confectionery composition according to claim 22, wherein the N-substituted-p-menthane carboxamide is present in an amount from about 1% to about 4%, by weight of the cooling composition.

24. The confectionery composition according to claim 15, further comprising a sweetening agent.

25. The confectionery composition according to claim 24, further comprising a sugar alcohol.

26. A method for preparing a chewing gum composition having long-lasting breath freshening perception without bitterness which comprises the steps of:

(1) providing the following ingredients
    (a) a gum base;
    (b) a bulking agent; and
    (c) a cooling composition;

wherein the cooling composition consists essentially of menthol and an N-substituted-p-menthane carboxamide, wherein the carboxamide may be represented by the formula:

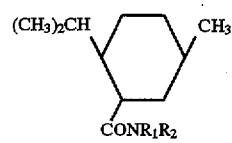

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; and wherein the N-substituted-p-menthane carboxamide is present in the cooling composition in an amount from about 0.001% to about 6%, and menthol is present in the cooling composition in an amount from about 94% to about 99.999%;

(2) melting the gum base;
(3) admixing the bulking agent and the cooling composition with the melted gum base; and
(4) forming the mixture from step (c) into suitable shapes.

27. A method for preparing a confectionery composition having long-lasting breath freshening perception without bitterness which comprises admixing a cooling composition with a confectionery bulking agent, wherein the cooling composition consists essentially of menthol and an N-substituted-p-menthane carboxamide, wherein the carboxamide may be represented by the formula:

wherein $R_1$ and $R_2$ may be independently selected from the group consisting of hydrogen and an alkyl group containing from 1 to 25 carbon atoms, with the proviso that when $R_1$ is hydrogen, $R_2$ may be an aryl group containing from 6 to 10 carbon atoms and, $R_1$ and $R_2$ when taken together, may be a cyclic or heterocyclic group containing up to 25 carbon atoms; and wherein the N-substituted-p-menthane carboxamide is present in the cooling composition in an amount from about 0.001% to about 6%, and menthol is present in the cooling composition in an amount from about 94% to about 99.999%.

* * * * *